United States Patent
Chelgren

(10) Patent No.: US 8,011,680 B2
(45) Date of Patent: Sep. 6, 2011

(54) WHEELCHAIR SUSPENSION SYSTEM

(76) Inventor: Eric Mark Chelgren, Ottumwa, IA (US)

( * ) Notice: Subject to any disclaimer, the term of this patent is extended or adjusted under 35 U.S.C. 154(b) by 16 days.

(21) Appl. No.: 12/620,238

(22) Filed: Nov. 17, 2009

(65) Prior Publication Data

US 2010/0123296 A1 May 20, 2010

Related U.S. Application Data

(60) Provisional application No. 61/115,364, filed on Nov. 17, 2008.

(51) Int. Cl.
*B60G 11/08* (2006.01)
(52) U.S. Cl. .............. 280/124.171; 180/209; 280/250.1
(58) Field of Classification Search .............. 180/209, 180/907; 280/124.1, 124.102, 124.11, 124.111, 280/124.125, 124.17, 124.171, 124.174, 280/250.1, 647, 650; 297/DIG. 4
See application file for complete search history.

(56) References Cited

U.S. PATENT DOCUMENTS

| | | | | |
|---|---|---|---|---|
| 191,536 A * | 6/1877 | Ludlow | ............... | 280/124.171 |
| 1,249,696 A * | 12/1917 | Waite | ............... | 280/124.113 |
| 1,361,047 A * | 12/1920 | Gregory et al. | ............... | 180/263 |
| 2,149,895 A * | 3/1939 | Maruhn | ............... | 267/36.1 |
| 4,288,096 A * | 9/1981 | Enokimoto et al. | ... | 280/124.136 |
| 4,407,383 A * | 10/1983 | Enokimoto et al. | ......... | 180/291 |
| 4,436,320 A * | 3/1984 | Brudermann et al. | ..... | 280/250.1 |
| 4,489,955 A * | 12/1984 | Hamilton | ............... | 280/250.1 |
| 5,839,750 A | 11/1998 | Smith | | |
| 6,341,657 B1 * | 1/2002 | Hopely et al. | ............ | 180/6.5 |
| 7,032,917 B1 * | 4/2006 | Chelgren | ............... | 280/304.1 |
| 7,052,001 B2 | 5/2006 | Hitt | | |
| 7,243,935 B2 * | 7/2007 | Beumer | ............... | 280/250.1 |
| 2003/0034635 A1 * | 2/2003 | Ludovici | ............ | 280/647 |
| 2003/0062703 A1 * | 4/2003 | Lin | ............... | 280/124.125 |

FOREIGN PATENT DOCUMENTS

FR 2586624 A1 * 3/1987

OTHER PUBLICATIONS 1-800 Wheelchair.com, Boing! Independent Suspension Wheelchair, www.1800wheelchair.com/asp/view-product.asp? product_id=1673.

* cited by examiner

*Primary Examiner* — Toan C To
*Assistant Examiner* — Laura Freedman
(74) *Attorney, Agent, or Firm* — Allan L. Harms; Shuttleworth & Ingersoll, PLC

(57) ABSTRACT

A wheelchair suspension system includes a suspension member which clamps to longitudinal bars of the wheelchair frame located below the seat of the wheelchair. The suspension member is elongate with upper and lower parallel leaf springs extending between the opposing ends of the suspension member. An axle support member is hinged to each end of the suspension member, by pivotal connection to each of the leaf springs. Each axle support member receives the axle of one of the opposing large rear wheels of the wheelchair. As the large wheels encounter uneven areas on the ground surface on which the wheelchair moves, the leaf springs flex reducing vibrations and shock to the wheelchair occupant. The axle support members maintain their generally upright orientation as the leaf springs flex so that camber angle of the rear wheels does not change.

3 Claims, 7 Drawing Sheets

WHEELCHAIR SUSPENSION SYSTEM

CROSS-REFERENCE TO RELATED APPLICATIONS

This application claims priority from provisional patent application entitled WHEELCHAIR SUSPENSION SYSTEM, Ser. No. 61/115,364 filed Nov. 17, 2008. The disclosure of provisional patent application Ser. No. 61/115,364 is hereby incorporated in its entirety.

BACKGROUND OF THE INVENTION

The present invention pertains to wheelchairs and particularly to suspension of the large rear wheels of wheelchairs which are manually operable.

In the typical manual wheelchair each rear wheel is a large wheel mounted to the frame of the wheelchair without any provision for absorption of shocks or damping of vibration of the wheelchair. In such a wheelchair, shocks and vibrations arising from irregularities and defects in the traveled surface are transmitted through the rear wheels to the wheelchair occupant. These shocks and vibrations contribute to spasms and back pain in wheelchair users. Studies have shown that low back pain is a common problem among people with disabilities who use wheelchairs.

One attempt to reduce shocks and vibrations to wheelchair users is shown in U.S. Pat. No. 4,455,031 wherein a shock absorber interconnects the seat of the wheelchair with a frame on which the large rear wheels are mounted. My U.S. Pat. No. 7,032,917 issued Apr. 25, 2006 discloses a solution to shock absorption in which separate suspension devices interconnect the rear wheel hubs to side frame members of the wheelchair frame. Additional solutions reducing vibration and shock to the body of wheelchair users are desirable.

SUMMARY

The present invention provides a rear suspension for a wheelchair which can be retrofitted to a wheelchair or installed at initial manufacture. The invention is directed toward a manually operated wheelchair, especially a sport wheelchair, which is driven by the rider pushing the large rear wheels by hand. The present invention provides a shock absorbing apparatus which isolates the large rear wheels from the wheelchair frame to reduce the shock and vibration felt by the user of a wheelchair traversing a surface.

The instant invention includes a suspension member which clamps to central longitudinal bars of the wheelchair frame, the longitudinal bars being located below the seat of the wheelchair. The suspension member is elongate, with mounting elements for the opposing large rear wheels of a manual wheelchair at opposing ends of the suspension member. Axle support plates are hinged to the opposing ends of the suspension member such that these axle support plates receive the axles of the hubs of the large rear wheels. The suspension includes upper and lower mounting blocks which receive the horizontal tubular frame members of the wheelchair frame and clamp the horizontal tubular frame members to the suspension member.

The rear suspension may flex vertically while the axle support plates remain in a substantially vertical orientation throughout such flexure. As a result, camber angle of the rear wheels retained to the suspension member does not change because of vertical flexure of the suspension.

The suspension system includes an upper leaf spring and a lower leaf spring separated by an upper mounting element and a lower mounting element which are identical except one is an inversion of the other. The upper and lower mounting elements are formed with semi-cylindrical openings in them such that the upper and lower mounting elements can capture and retain the longitudinal frame bars between them. The upper leaf spring and lower leaf spring are slightly curved at rest and both leaf springs remain substantially parallel to one another.

An upper plate is centered atop the upper leaf spring and a lower plate is centered below and touching the lower leaf spring. The upper plate and lower plate are best composed of aluminum so that the weight of the suspension remains minimal. Voids in the upper plate and lower plate serve to lessen the weight of the plates. The upper and lower plates retain the upper and lower leaf springs to the mounting elements by plural bolts passing from upper plate through to the lower plate.

It is an object of the invention to provide a shock absorbing apparatus to reduce the transmission of bumps and shocks from the large rear wheels of a wheelchair to the rider in the wheelchair.

It is a further object of the invention to provide an improved manual wheelchair which is less uncomfortable for the user to ride over irregular surfaces.

It is also an object of the invention to provide a shock absorbing rear suspension which can be easily added to an existing wheelchair.

These and other objects will become apparent from examination of the description which follows.

BRIEF DESCRIPTION OF THE SEVERAL VIEWS OF THE DRAWING(S)

DETAILED DESCRIPTION OF THE INVENTION

Figure 1:
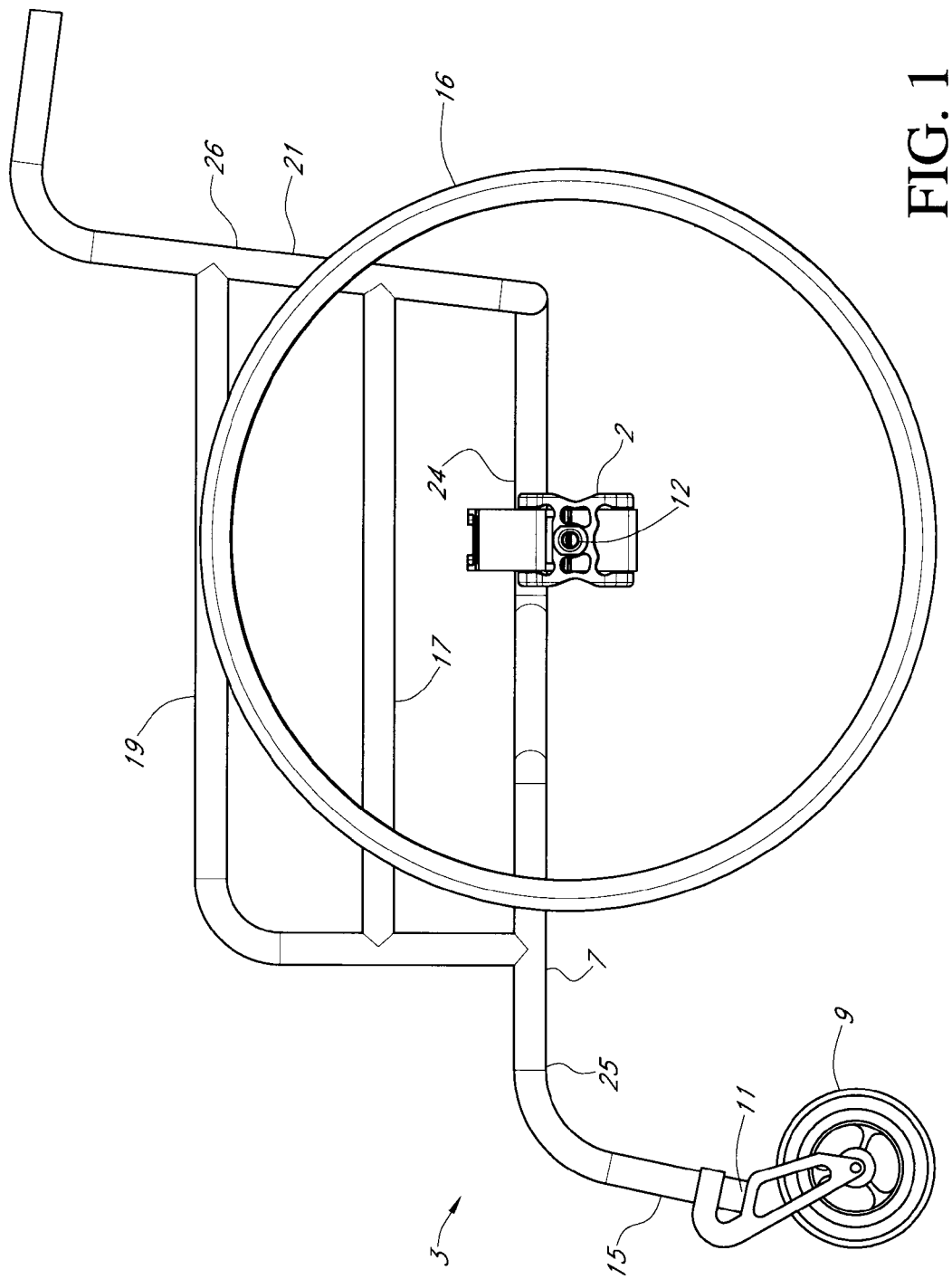
FIG. 1 is a side elevation of a wheelchair with wheel spoke and seat elements omitted, the wheelchair being equipped with the invention which is mounted to the axles of the large rear wheels.

FIG. 1 discloses a wheelchair 3 which comprises large rear wheels of which left side rear wheel 16 is seen in this figure. The wheelchair frame 7 is supported on the rear wheels and by front casters, of which caster 9 on left side of wheelchair 3 can be observed in FIG. 1. Caster 9 is connected to lower end 11 of front frame element 15 which is oriented generally vertically. Front frame element 15 is joined to wheelchair frame 7 at front end 25 thereof. All parts of wheelchair frame 7 are preferably tubular and of light weight metals. Wheelchair frame 7 includes rear frame assembly 26 which comprises lower longitudinal elongate tubular member 24 as well as intermediate side bar 17 and upper side bar 19, all of which extend longitudinally forward of upright rear frame element 21. Mirror images of lower tubular member 24, intermediate side bar 17 and upper side bar 19 are provided on the opposing side of wheelchair frame 7 as will be seen in FIGS. 2, 3. A seat cushion and seat cushion support structure have been omitted but would be supported by intermediate side bars 17, 37 (See FIG. 2).

As seen in FIG. 1, rear wheel 16 supports wheelchair frame 7 at axle 12 thereof. Suspension invention 2 interconnects axle 12 to wheelchair frame 7 by attachment to lower tubular frame member 24 and its parallel twin member 22 (See FIG. 2).

Figure 2:
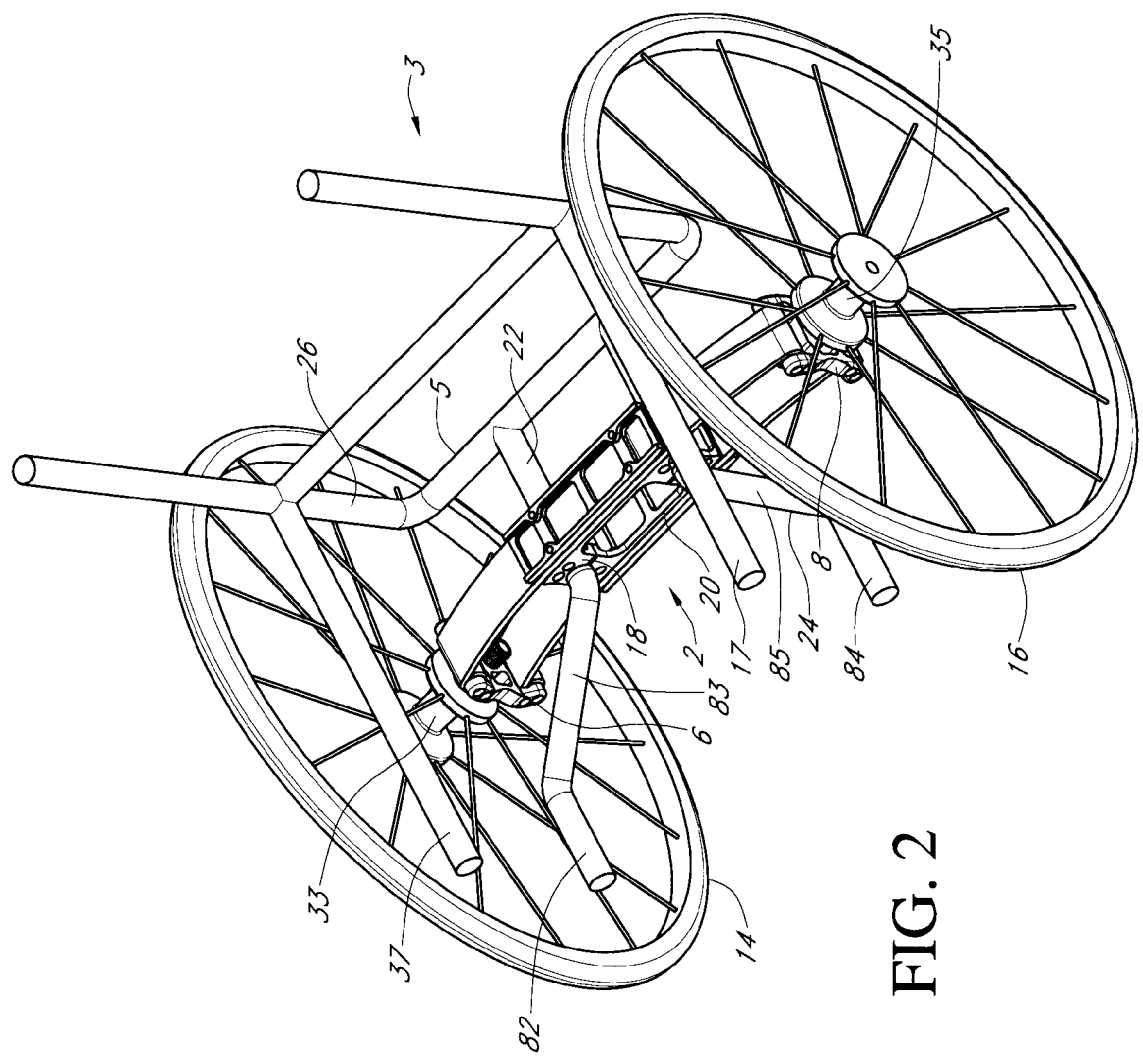
FIG. 2 is a front perspective of a wheelchair with parts thereof omitted, the wheelchair equipped with a first embodiment suspension system attached to the rear wheels.
Figure 3:
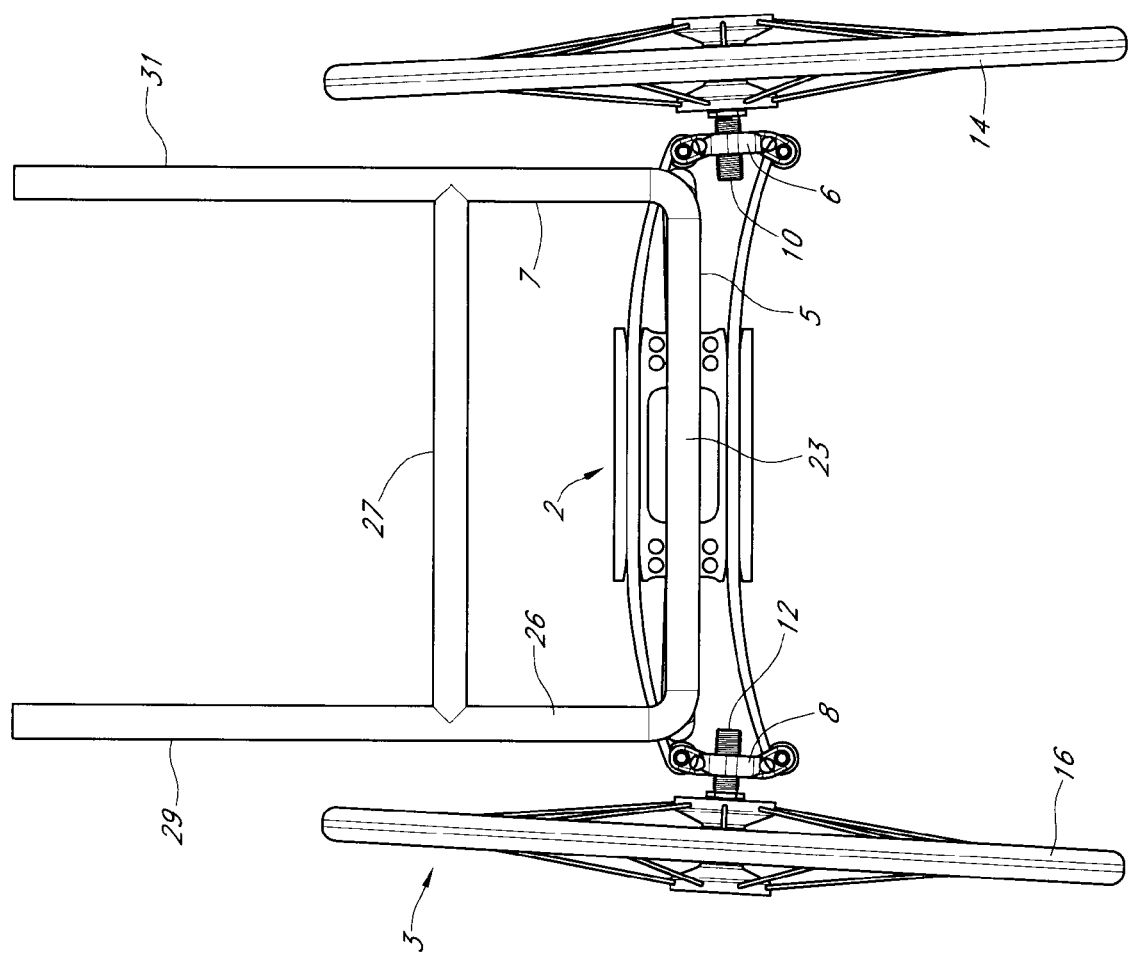
FIG. 3 is a rear elevation of a wheelchair equipped with the suspension system of FIG. 2, with parts of the wheelchair omitted for clarity.

FIGS. 2 and 3 illustrate the new rear suspension 2 shown mounted to the lower frame 5 of a wheelchair 3. The wheelchair 3 is provided with opposing wheels 14, 16 which serve as the rear wheels of the wheelchair 3. Rear wheels 14, 16 may be manually driven by the user and will be manually driven when operated by a wheelchair athlete. Wheelchair 3 also comprises rear frame assembly 26 which includes elongate tubular frame members 22, 24 which are substantially laterally parallel and horizontally disposed when wheelchair 3 rests on a horizontal surface. Each of horizontal tubular frame members 22, 24 is disposed slightly above the axles 10, 12 of rear wheels 14, 16 of wheelchair 3 due to the interconnection of the tubular frame members 22, 24 to wheel axles 10, 12 by suspension 2. Tubular frame members 22, 24 extend horizontally forward of lower cross bar 23 of seat support frame member 26. Tubular frame members 22, 24 include angled segments 83, 85 respectively which effect lateral divergence of tubular frame members 22, 24 at forward segments 82, 84 thereof such that forward segments 82, 84 are laterally parallel to one another. Upper cross bar 27 interconnects upright bar members 29, 31 of rear frame assembly 26.

The rear suspension 2 includes opposing axle support plates 6, 8 which receive the axles 10, 12 of the rear wheels 14, 16 of the wheelchair 3. Wheel hubs 33, 35 are freely rotatable about axles 10, 12. The rear suspension 2 includes upper and lower mounting elements 18, 20 which receive horizontal tubular frame members 22, 24 which extend forward from rear frame assembly 26 of wheelchair 3.

The rear suspension 2 may flex vertically while axle support plates 6, 8 remain in a substantially vertical orientation throughout such flexure. As a result, camber angle of the rear wheels 14,16 does not change because of vertical flexure of the suspension 2.

Figure 4:
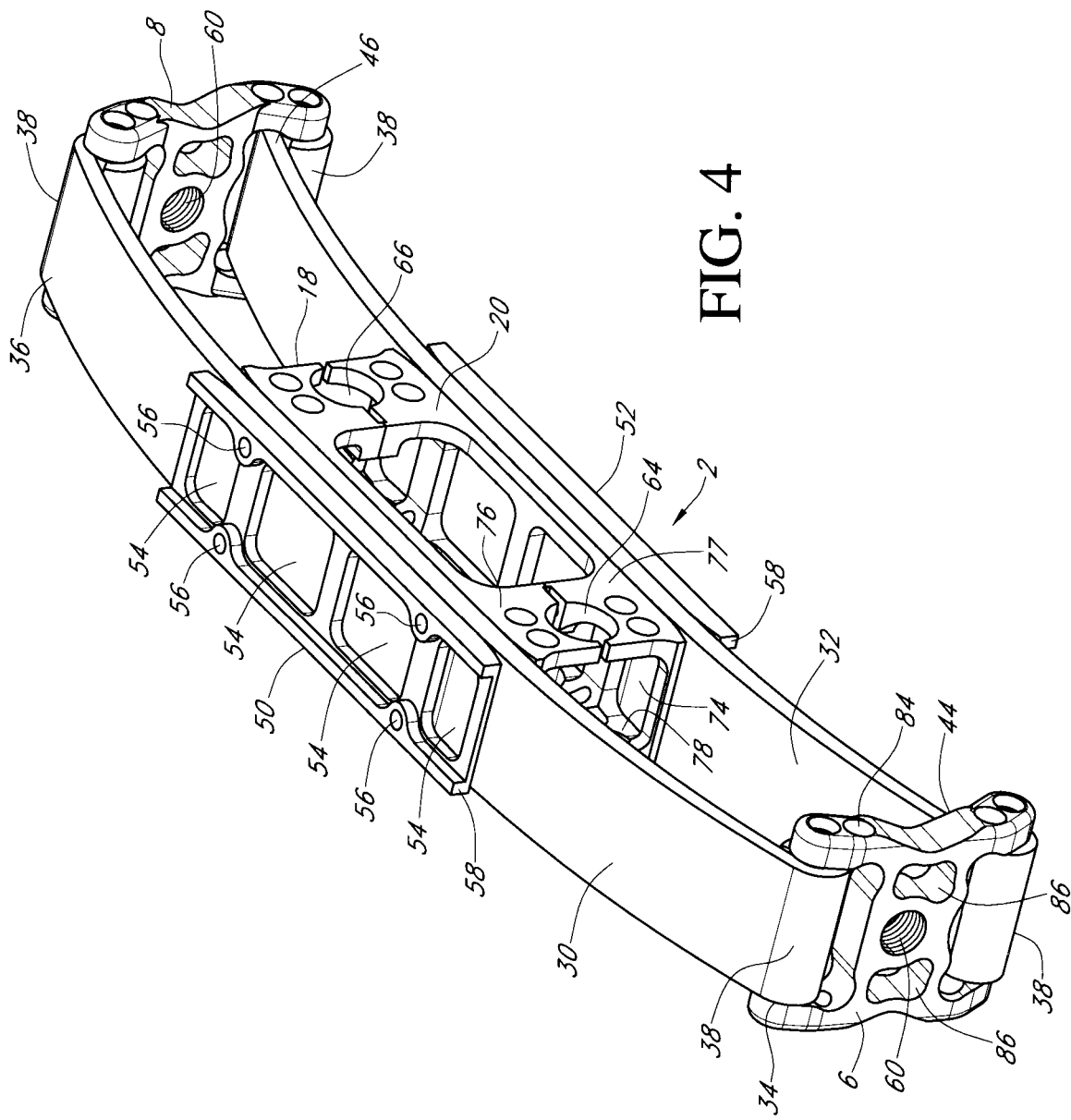
FIG. 4 is a front left perspective view of the first embodiment of the suspension member.
Figure 5:
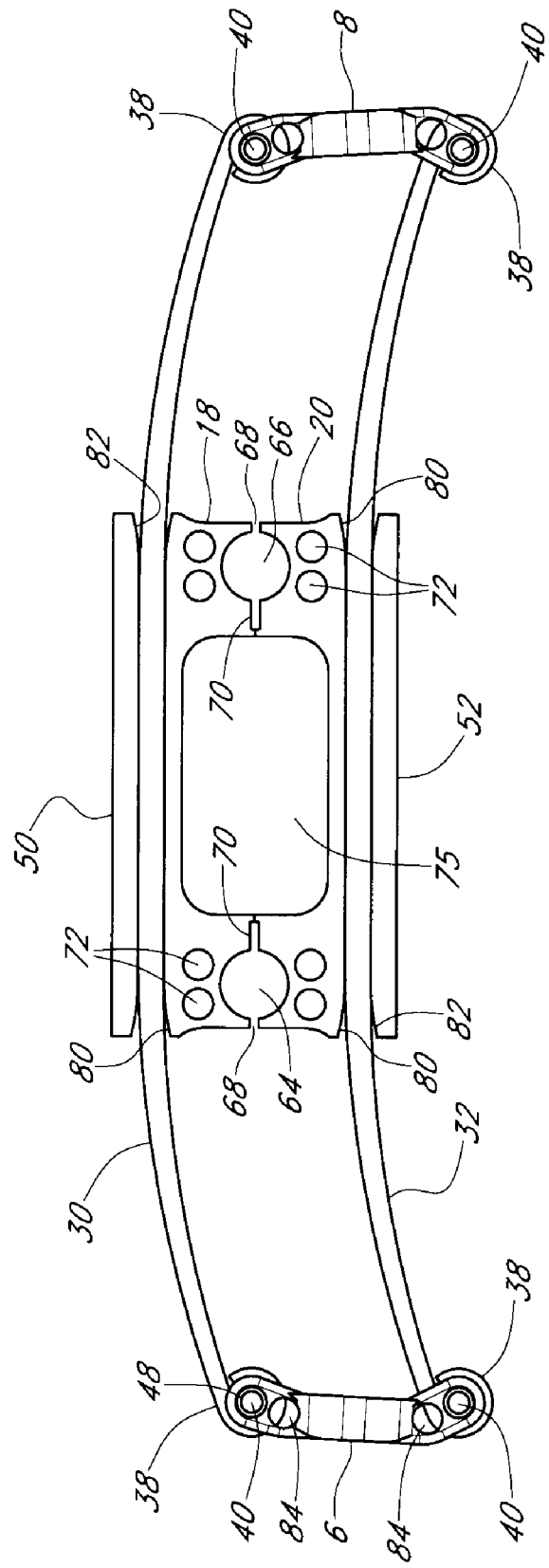
FIG. 5 is a front elevation of the suspension member of FIG. 4.

In FIGS. 4 and 5, the first embodiment of the rear wheel suspension system 2 for a wheelchair is shown isolated from the wheelchair itself. The suspension system 2 comprises an upper leaf spring 30 and a lower leaf spring 32 separated by an upper mounting element 18 and a lower mounting element 20. The upper leaf spring 30 and lower leaf spring 32 are slightly curved at rest and both leaf springs 30, 32 remain substantially in parallel with one another whether at rest or when flexed. Each leaf spring 30, 32 is substantially elongate and of thickness which is substantially less than the traverse dimension thereof. Each leaf spring 30, 32 is made of spring steel or other material which will flex but return to its original longitudinal curvature at rest.

The upper leaf spring 30 and lower leaf spring 32 further comprise first ends 34, 44 and second ends 36, 46. Each first end 34, 44 and second end 36, 46 comprises a pivot axle bearing housing 38. Referring specifically to FIG. 5, each pivot axle bearing housing 38 receives a pivot pin 40 within bushing 48. Pivot pin 40 is retained at its opposing ends to the axle support plates 6, 8. Therefore, each pivot axle bearing housing 38 may rotate about the pivot pin 40 received within it as the upper leaf spring 30 and lower leaf spring 32 flex, allowing the axle support plates 6, 8 to which the pivot pins 40 are retained to remain in a selected substantially vertical orientation regardless of the flexure of the leaf springs 30, 32. Each of leaf springs 30, 32 extend from first axle support plate 6 to opposing axle support plate 8.

Again referring to FIGS. 4 and 5, an upper plate 50 is preferably centered atop the upper leaf spring 30 and a lower plate 52 is preferably centered underneath and touching the lower leaf spring 32. The upper plate 50 and lower plate 52 are preferably rigid and may be made of a metal and in the preferred embodiment the upper plate 50 and lower plate 52 are composed of aluminum. The voids 54 in the upper plate 50 and lower plate 52 serve to lessen the weight of the plates 50, 52. Ribs 58 extending along each plate 50, 52 are integral therewith to provide additional rigidity to plates 50, 52.

Upper plate 50, upper leaf spring 30, upper and lower mounting elements 18, 20, lower leaf spring 32, and lower plate 52 are held together by plural bolts 56 passing from upper plate 50, through upper leaf spring 30, upper mounting element 18, lower mounting element 20, lower leaf spring 32 and joined to lower plate 52. Referring again to FIGS. 2 and 3, upper and lower mounting elements 18, 20 clamp about the horizontal tubular frame members 22, 24 of frame 7 of wheelchair 3. Plural bolts 56 may be adjusted to properly secure the horizontal tubular frame members 22, 24 to suspension system 2. Passageways 64, 66 are provided to receive the parallel longitudinal tubular frame members 22, 24. Gaps 68, 70 remain at sides of passageways 64, 66 to allow tolerance to clamp tubular frame members 22, 24 securely. Gaps 68, 70 are provided by forming upper mounting element 18 and lower mounting element 20 such that when brought together, gaps 68, 70 remain.

Weight saving voids 72 are formed through mounting blocks 18, 20 to reduce weight.

A threaded opening 60 in each of axle support plates 6, 8 is configured to receive the axles 10, 12 of wheelchair 3. Axle support plates 6, 8 each contain transverse passageways 84 and end voids 86 to reduce weight further.

Upper and lower mounting elements 18, 20 are each preferably formed as a shell with end voids 74 between first vertical wall 76, 77 and opposing second vertical wall 78 (opposing wall of upper mounting element 18 hidden) of each mounting elements 18, 20. Large void openings are provided laterally through the assembled upper and lower mounting elements 18, 20.

Each of mounting elements 18, 20 is further machined or otherwise formed with tapered ends 80 to allow leeway for flexure of leaf springs 30, 32. Similarly each plate 50, 52 is tapered at opposing ends such that a gap 82 remains between leaf springs 30, 32 and the opposing ends 80 of blocks 50, 52, again to allow space for leaf springs 30, 32 to more easily flex.

Figure 6:
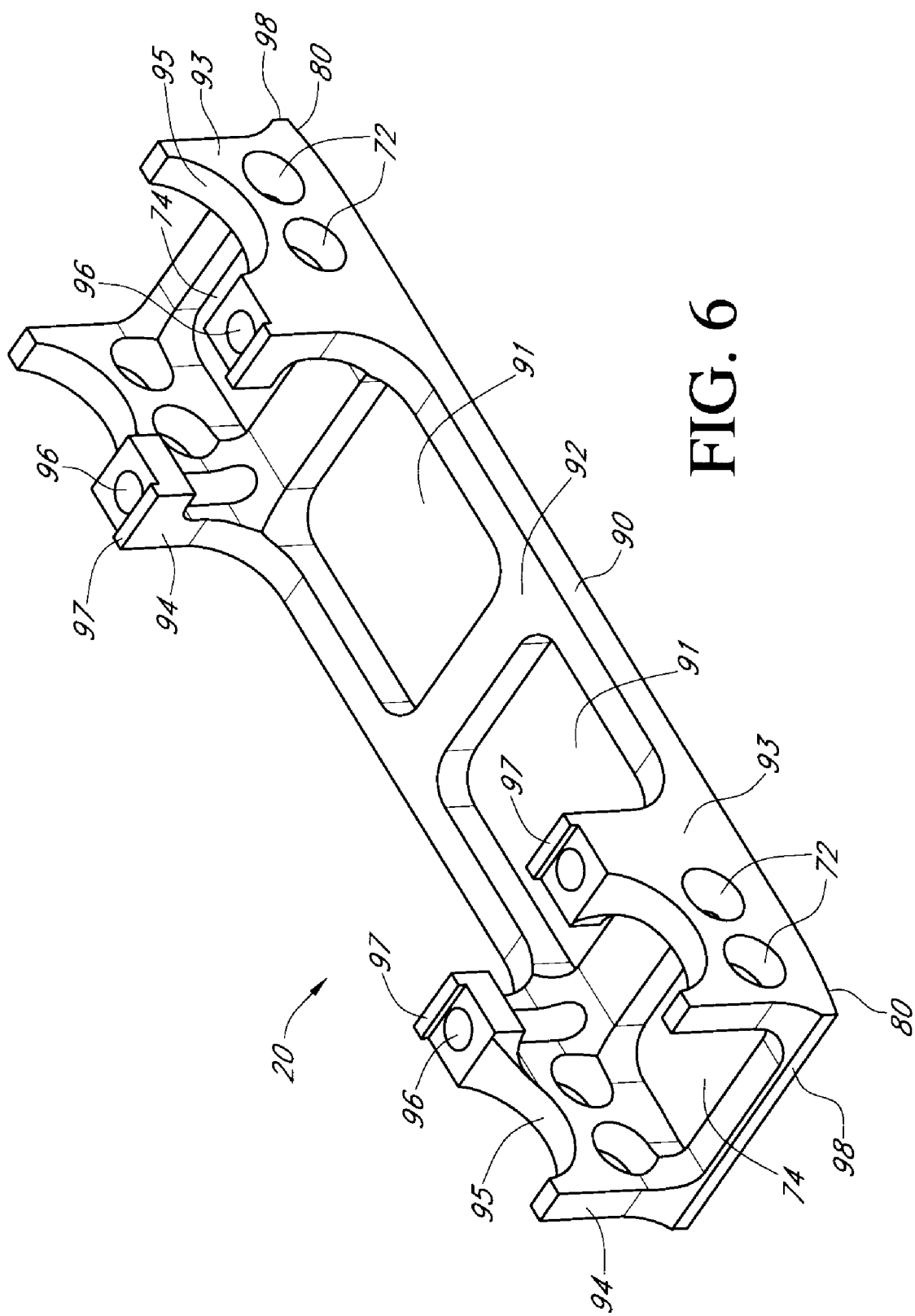
FIG. 6 is an enlarged perspective of a lower mounting element of the invention.

FIG. 6 is an enlarged perspective of the lower mounting element 20 of the suspension 2. It should be understood that upper mounting element 18 is an inverted duplicate of lower mounting element 20. Lower mounting element 20 comprises an elongate base 90 with voids 74, 91 therethrough to reduce the weight of lower mounting element 20. Preferably mounting element 20 is formed of a lightweight metal such as aluminum. Mounting element 20 is preferably symmetrical about its center segment 92. Side walls 93, 94 upstand from the base 90 at opposing edges thereof. Voids 72, 74 are formed in each side wall 93, 94, again to reduce weight without sacrificing rigidity. Each sidewall 93, 94 is provided with a semi-cylindrical recess 95 which in cooperation with the identical recess of the upper mounting element 18 creates tubular member receiving passageways 60. (See FIGS. 4 and 5).

Each opposing end 80 of base 90 is tapered such that ends 80 are not coplanar with the remainder of underside of base 90, the tapered ends 80 allowing movement of a leaf spring 30, 32 when such leaf spring 30, 32 flexes. Each end 80 of base 90 juts a short distance via protruding edge 98 beyond the adjacent sidewall 93, 94.

Bolt passageways 96 pass vertically through sidewalls 93, 94 to accommodate bolts 56 which are used to secure the plates 50, 52, leaf springs 30, 32 and mounting elements 18, 20 together. Adjacent bolt passageways 96 are abutment surfaces 97 which come into abutment with identical surfaces on the upper mounting element 18 when the mounting elements 18, 20 are assembled. Abutment surfaces 97 cause gaps 68, 70 to exist when upper and lower mounting elements 18, 20 are brought into abutment. (See FIG. 5).

Figure 7:
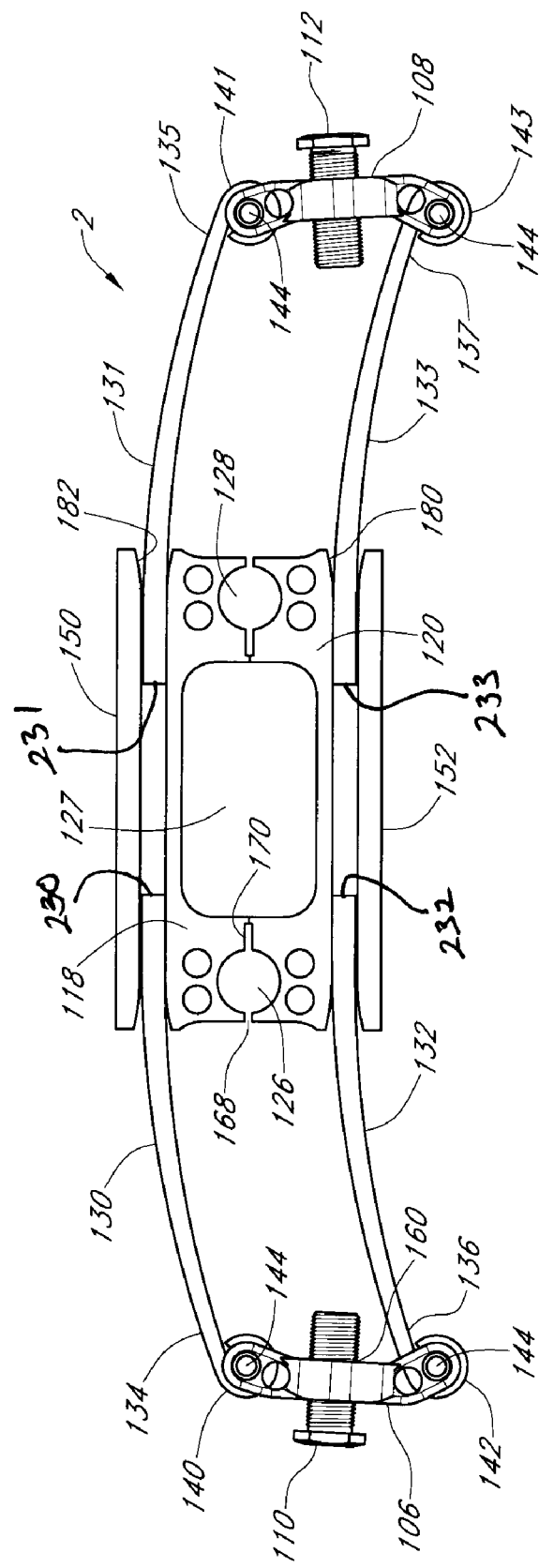
FIG. 7 is a front elevation of a second width-adjustable embodiment of a suspension system for a wheelchair.

FIG. 7 diagrammatically illustrates an alternative embodiment wheelchair suspension system 102 in which an upper pair of leaf spring members 130 and 131 are retained to frame mounting elements 118, 120, preferably by mounting bolts (hidden from view). Similarly and symmetrically, paired leaf spring members 132, 133 are retained to lower frame mounting element 120 by mounting bolts. Additionally, an upper retaining member 150 and a lower retaining member 152 assist in retaining leaf spring members 130, 131 and 132, 133 to frame mounting elements 118, 120. Each frame mounting element 118, 120 is equivalent to the mounting element 18 shown in FIG. 6. Bolts passing from upper retaining member 150 to lower retaining member 152 serve to retain leaf spring members 130, 131 and 132, 133 to frame mounting elements 118, 120, and to secure wheelchair frame members within openings 126, 128 formed by recesses in mounting elements 118, 120. Central void 127 created when mounting elements 118, 120 are assembled reduces the weight of material, preferably aluminum, of upper and lower frame mounting blocks 118, 120.

The alternative embodiment wheelchair suspension system 102 permits separation adjustment of leaf spring members 130, 131 and 132, 133 to allow selective widening of wheelchair suspension system 102 for wider frame wheelchairs by allowing leaf spring members 130, 131 and 132, 133 to be adjusted inwardly or outwardly and still to be retained to frame mounting elements 118 and 120. In particular, each leaf spring member 130, 131, 132, 133 includes a proximal end 230, 231, 232, 233 respectively, with the proximal ends 230, 231 of leaf spring members 130, 131 selectively continuously adjustable between a spaced apart positioning as seen in FIG. 7 to the proximal ends 230, 231 being in abutment. Likewise, each of leaf spring members 132, 133 includes a proximal end 232, 233 which opposes the proximal end of the other leaf spring member 132, 133. Leaf spring members 132, 133 likewise may be adjusted to any spacing between proximal ends 232, 233 thereof being in abutment to a spaced apart opposition as illustrated in FIG. 7. After desired adjustment of spacing between proximal ends 230, 231, and spacing between proximal ends 232, 233, bolts (not seen) may be tightened to apply clamping force of upper plate 150 and lower plate 152 to secure leaf spring members 130, 131, 132, 133 to upper frame mounting elements 118, 120.

Axle support plate 106 is hingedly retained to each of distal ends 134, 136 of upper leaf spring member 130 and lower leaf spring member 132 by use of cylindrical bearings 140, 142 which may be formed by roll turning distal ends 134, 135 of the leaf members 130, 131 and likewise the distal ends 136, 137 of leaf spring members 132, 133. Similarly, opposing axle support plate 108 is hingedly fixed to each of distal ends 135, 137 of upper leaf spring member 131 and lower leaf spring member 133 by use of hinge pins 144 through cylindrical bearings 141, 143. Wheelchair axles 110, 112 are screw threaded into axle support plates 106, 108, respectively with threaded openings 160 therein disposed such that the wheels mounted on axles 110, 112 are supported at a desired camber angle. The camber angle of support plates 106, 108 may be adjusted by sliding leaf springs 130, 131 inward or outward. Flexure of leaf spring members 130, 131 and 132, 133 of suspension system 102 does not cause variation in the camber angle of the wheels mounted on axles 110, 112, due to the parallelism of leaf spring members 130 132, and 131, 133, and due to their hinged connection to axle supports plates 106, 108.

Tapers 180 at corners of upper and lower mounting block members 118, 120 and reduced thickness at upper and lower plates 150, 152, at each end thereof, allow room for flexing movement of leaf springs 130, 131, 132 and 133.

In operation, as large rear wheels 14, 16 encounter uneven support surfaces, any upward thrust is attenuated by flexure of leaf springs 30, 32 as axle support plate 6 or axle support plate 8 is forced upward. Because leaf springs 30, 32 of suspension 2 or leaf spring members 130, 131, 132, 133 of alternate embodiment suspension 102 are formed of spring steel or other material which will flex but return to its original shape, the upward thrust of either rear wheel 14, 16 will be diminished when it reaches rear frame assembly 26 on which the wheelchair user is seated.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, we claim:

1. In a wheelchair having relatively large rear wheels and at least two spaced apart longitudinal frame members located below a seat thereof, the longitudinal members disposed at substantially equivalent elevation relative to a centerline passing through hubs of the rear wheels thereof, the improvement comprising a suspension member mounted to the at least two spaced apart longitudinal frame members, the suspension member comprising a mounting assembly mounted to the at least two spaced apart longitudinal frame members, the suspension member further comprising upper and lower leaf spring members retained to the mounting assembly, each of the upper and lower leaf spring members having opposing first and second ends, the first end of the upper leaf spring member hinged to an upper end of a first axle receiving member, the first end of the lower leaf spring member hinged to a lower end of the first axle receiving member, the second end of the upper leaf spring member hinged to an upper end of a second axle receiving member, the second end of the lower leaf spring member hinged to a lower end of the second axle receiving member, each axle receiving member receiving an axle of a wheel hub of one of the large rear wheels, fasteners retaining the upper leaf spring and the lower leaf spring to the mounting assembly of the suspension member, the mounting assembly substantially shorter than either of the leaf spring members.

2. An improved non-motorized wheelchair comprising
a wheelchair frame including front lower caster supported elements,
front casters supporting a front end of the wheelchair frame,
the wheelchair frame further including a rear frame assembly,
the rear frame assembly supported by an opposing pair of large rear wheels,
the rear wheels being substantially larger than the front casters,
the rear frame assembly comprising at least two spaced apart generally parallel horizontal bars extending longitudinally below a seat of the wheelchair,
a suspension member mounted to the at least two spaced apart generally parallel horizontal bars,
the suspension member comprising a mounting member mounted to the at least two spaced apart generally parallel horizontal bars,
the suspension member further comprising upper and lower leaf spring members retained to the mounting member,
each of the upper and lower leaf spring members having opposing first and second ends,
the first end of the upper leaf spring member hinged to an upper end of a first axle receiving member,
the first end of the lower leaf spring member hinged to a lower end of the first axle receiving member,
the second end of the upper leaf spring member hinged to an upper end of a second axle receiving member,
the second end of the lower leaf spring member hinged to a lower end of the second axle receiving member,
each axle receiving member receiving an axle of a wheel hub of one of the large rear wheels,
an upper retaining member touchingly overlying the upper leaf spring member,
a lower retaining member touchingly underlying the lower leaf spring member,
fastening elements retaining the upper retaining member and the lower retaining member to the mounting assembly of the suspension member,
the mounting assembly substantially shorter than either of the leaf spring members,
the upper and lower retaining members generally vertically aligned with the mounting assembly.

3. A suspension for a wheelchair having a frame, the invention comprising
first and second elongate leaf members spaced apart vertically by a wheelchair frame engaging element,
the wheelchair frame engaging element receiving at least one horizontal member of the frame of the wheelchair,
the wheelchair frame engaging element secured to the at least one horizontal member,
each of the first and second leaf members having opposing ends,
a hinge element disposed at each of the opposing ends of each of the first and second leaf members,
the hinge element of a first end of each of the leaf members hingedly engaging a first axle receiving member,
the hinge element of a second end of each of the leaf members hingedly engaging a second axle receiving member,
the axle receiving members receiving wheel axles of opposing wheels of the wheelchair,
the first and second elongate leaf members each comprises first and second elements,
each of the first and second elements includes a proximal end,
the proximal end of the first element of the first elongate leaf member opposing the proximal end of the second element of the first elongate leaf member,
each of the first and second elements of the first leaf member selectively adjustable relative to the other of the first and second elements of the first leaf member to provide some or no spacing between the proximal ends thereof,
the proximal end of the first element of the second elongate leaf member opposing the proximal end of the second element of the second elongate leaf member,
each of the first and second elements of the second leaf member selectively adjustable relative to the other of the first and second elements of the second leaf member to provide some or no spacing between the proximal ends thereof,
a width of the suspension selectively adjustable by selective spacing between the proximal ends of the first and second elements of each of the first and second leaf members.

* * * * *